Coffman & Graybill.
Hay-Rake & Loader.
N° 75528. Patented Mar. 17 1868.
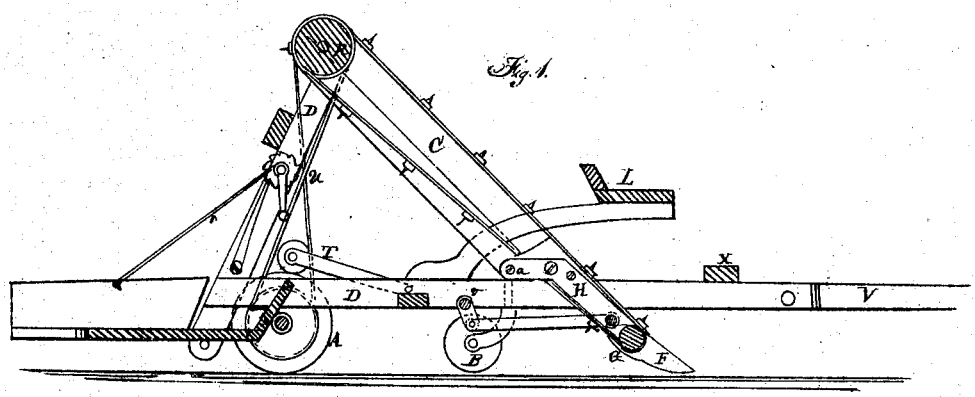
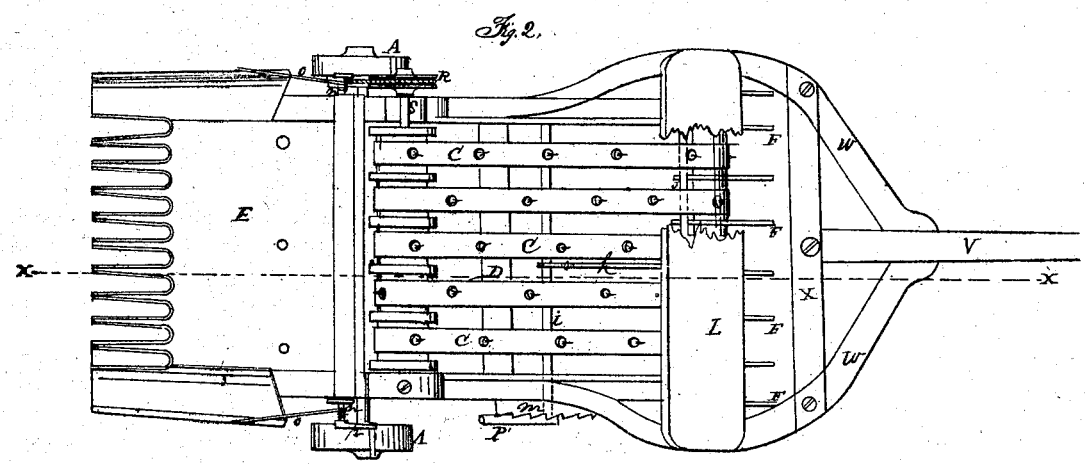

United States Patent Office.

JOHN S. COFFMAN AND MANASSAH GRAYBILL, OF GREENVILLE, INDIANA.

Letters Patent No. 75,528, dated March 17, 1868.

---

IMPROVEMENT IN HAY-RAKERS AND LOADERS.

---

The Schedule referred to in these Letters Patent and making part of the same.

---

TO ALL WHOM IT MAY CONCERN:

Be it known that we, JOHN S. COFFMAN and MANASSAH GRAYBILL, of Greenville, in the county of Floyd, and State of Indiana, have invented a new and improved Hay-Gatherer and Conveyer; and we do hereby declare that the following is a full, clear, and exact description thereof, which will enable those skilled in the art to make and use the same, reference being had to the accompanying drawings, forming part of this specification.

The component parts of the machine consist mainly of the teeth, the apron, the platform, and the burden-wheels, so constructed and arranged as to operate as intended, in combination with the frame and other parts, as will be hereinafter described.

Figure 1 represents a sectional side elevation of the machine, showing the parts of which it is composed and the manner in which they are arranged, the section being through the line $x\ x$ of fig. 2.

Figure 2 is a top or plan view of the same.

Similar letters of reference indicate corresponding parts.

The machine is supported mainly on two wheels, which are attached to an iron axle, and which revolve outside the frame, after the manner of the wheels of a cart. There are also other wheels, which are hung as casters under each side of the frame, and which revolve and turn independently of each other for the purpose of more conveniently turning the machine.

The burden-wheels are marked A, and the caster-wheels B. C represents the apron, by which the hay is elevated. D represents the frame. E represents the platform, on to which the hay is delivered from the apron. F represents the teeth, which are loosely hung on the lower bar, over which the endless apron passes. The front ends of these teeth are bevelled off, so that they pass over the ground without catching, while they pass under the hay, which slides up over them on to the apron. The end of the bar, which supports the teeth, is seen at G, fig. 1. Between the teeth on the bar there are small sleeve-pulleys, which revolve on the bar, and which not only keep the teeth a proper distance apart, but serve as pullers for the belts of the apron, as seen in fig. 2. The bar G, at each end, is attached to an arm, H, which is hinged to the frame by pivots at $a$, as seen in the drawing, so that the teeth and end of the apron can be elevated, and the teeth run clear of the ground when not gathering the hay. This is done by an arm, which is attached to two transverse rods, one of which, J, is secured at each end to the arms H, just above the bar G, as seen. The other rod, $i$, is secured to the frame at each end. Upon one end there is a lever, P', which lever is within reach of the driver, and by which the rod is turned or partially revolved. The arm, which connects these two rods, $i$ and J, is seen at $k$. This arm has a jointed connection on the rod $i$, and the arrangement is such that when the lever is pushed back by the driver, the arm $k$ is thrust forward, which raises the apron. There is a ratchet-plate, $m$, on the side of the frame to catch the lever, so that the apron can be held stationary in any desired position. L is the driver's seat. The platform, E, is elevated by cords, which are wound up around a rod, the ends of which are seen at $n\ n$. At one of the ends of this rod there is a crank, by which the rod is revolved, and also a ratchet-wheel and pawl, by which the platform is held in a horizontal position, as when being loaded. The elevating-cords are marked $o\ o$. $p$ represents the crank on the rod $n$. The apron is revolved by a belt from a pulley on the inside of one of the burden-wheels, as seen in the drawing. The pulley on the end of the upper shaft of the apron is seen at R. The shaft is seen in fig. 2 at S. It revolves in boxes on the top of the frame, carrying with it a drum, over which the apron passes, as seen. I represents a tightening-lever and pulley, for the driving-belt $u$. V is the tongue or pole, to which the team is attached. $w\ w$ represent the crotch, by which the pole is attached to the machine. $x$ is a cross-piece, supporting the crotch.

The apron may be formed in any suitable manner, either of belts, as shown in the drawing, or of cords. In either case, spikes, or some other device for holding the hay, must be attached to the belt. In the drawing spikes are passed through the belts, which prevent the hay from slipping from the apron.

The machine is made of suitable size, and of suitable materials throughout, and when in operation is drawn over the meadow with the driver on the seat L, who manages and controls the position of the teeth and end of the apron by the lever P' on the shaft or rod $i$. The hay is carried up on the apron, and drops from the end of it on to the platform E, where it is properly stowed for transportation to the barn. The machine takes the hay as it lies scattered over the ground, or as the mower leaves it, rakes it up, and loads it at one operation.

Having thus described our invention, we claim as new, and desire to secure by Letters Patent—

1. The loose teeth F and bar G, in combination with the pivoted arm H, rods J $i$, jointed connecting-bar $k$, and lever P', all arranged to operate as herein shown and described.

2. The receiving-platform E, when adjusted upon the frame D by means of the cord $o$, ratchet and pawl, and the crank $p$ upon the rod $n$, as herein described, for the purpose specified.

3. The arrangement of the frame D, burden-wheel A, caster-wheels B, adjustable apron E, loose teeth F, and their operating-mechanism, the endless apron C, and shaft G, all operating as described, for the purpose specified.

JOHN S. COFFMAN,
MANASSAH GRAYBILL.

Witnesses:
JONATHAN DAVIS,
GEORGE COFFMAN.